United States Patent
Kang et al.

(10) Patent No.: US 9,866,295 B2
(45) Date of Patent: Jan. 9, 2018

(54) METHOD FOR TRANSMITTING SIGNAL USING TERMINAL MOBILITY-BASED PRECODER CYCLE TECHNIQUE, AND APPARATUS THEREFOR

(71) Applicant: LG ELECTRONICS INC., Seoul (KR)

(72) Inventors: Jiwon Kang, Seoul (KR); Sunam Kim, Seoul (KR); Kitae Kim, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/324,168

(22) PCT Filed: Mar. 31, 2015

(86) PCT No.: PCT/KR2015/003171
§ 371 (c)(1),
(2) Date: Jan. 5, 2017

(87) PCT Pub. No.: WO2016/013750
PCT Pub. Date: Jan. 28, 2016

(65) Prior Publication Data
US 2017/0207834 A1    Jul. 20, 2017

Related U.S. Application Data

(60) Provisional application No. 62/028,786, filed on Jul. 24, 2014.

(51) Int. Cl.
*H04B 7/0456* (2017.01)
*H04W 72/04* (2009.01)
(Continued)

(52) U.S. Cl.
CPC ......... *H04B 7/0456* (2013.01); *H04B 7/0617* (2013.01); *H04L 5/0048* (2013.01);
(Continued)

(58) Field of Classification Search
CPC ... H04B 7/0456; H04B 7/0617; H04L 5/0048; H04W 72/0446; H04W 72/0453; H04W 72/048
See application file for complete search history.

(56) References Cited

U.S. PATENT DOCUMENTS

2010/0284484 A1    11/2010  Jöngren et al.
2011/0255483 A1*  10/2011  Xu ..................... H04L 25/0232
                                                            370/329
(Continued)

OTHER PUBLICATIONS

Qualcomm Incorporated, "Transmission modes for NCT", 3GPP TSG-RAN WG1 #69, R1-122770, Prague, Czech Republic, May 21-25, 2012, 15 pages.

*Primary Examiner* — Syed Haider
(74) *Attorney, Agent, or Firm* — Birch, Stewart, Kolasch & Birch, LLP

(57) ABSTRACT

The present application discloses a method for transmitting a signal from a transmitting end to a receiving end in a wireless communication system. Specifically, the method comprises the steps of: configuring a precoder set including one or more precoders; precoding the signal by cyclically applying the one or more precoders in a specific resource unit; and transmitting the precoded signal to the receiving end, wherein at least one of the size of the precoder set and the one or more precoders is determined on the basis of the mobility of the receiving end.

12 Claims, 17 Drawing Sheets

(51) Int. Cl.
*H04L 5/00* (2006.01)
*H04B 7/06* (2006.01)

(52) U.S. Cl.
CPC ..... *H04W 72/048* (2013.01); *H04W 72/0446* (2013.01); *H04W 72/0453* (2013.01)

(56) References Cited

U.S. PATENT DOCUMENTS

| | | | | |
|---|---|---|---|---|
| 2012/0087401 | A1* | 4/2012 | Bhattad | H04B 7/0486 375/224 |
| 2013/0057432 | A1* | 3/2013 | Rajagopal | H01Q 25/002 342/368 |
| 2014/0003395 | A1* | 1/2014 | Hsu | H04B 7/0478 370/335 |
| 2014/0029650 | A1* | 1/2014 | Park | H04B 7/0604 375/219 |
| 2014/0334564 | A1* | 11/2014 | Singh | H04B 7/0413 375/267 |

* cited by examiner

FIG. 2
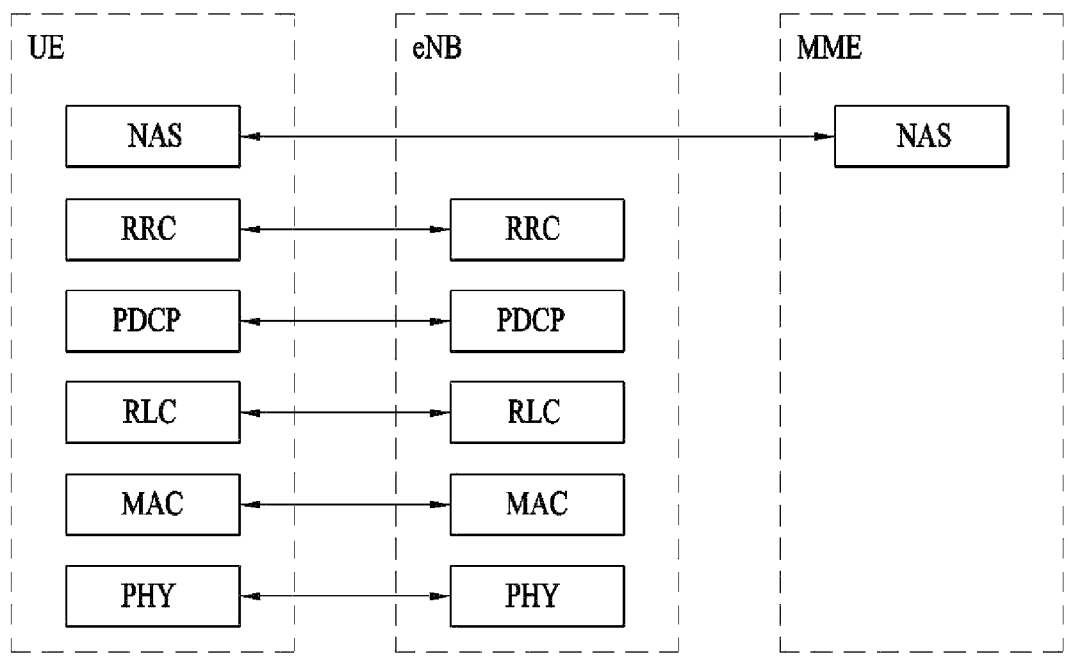
(A) CONTROL-PLANE PROTOCOL STACK
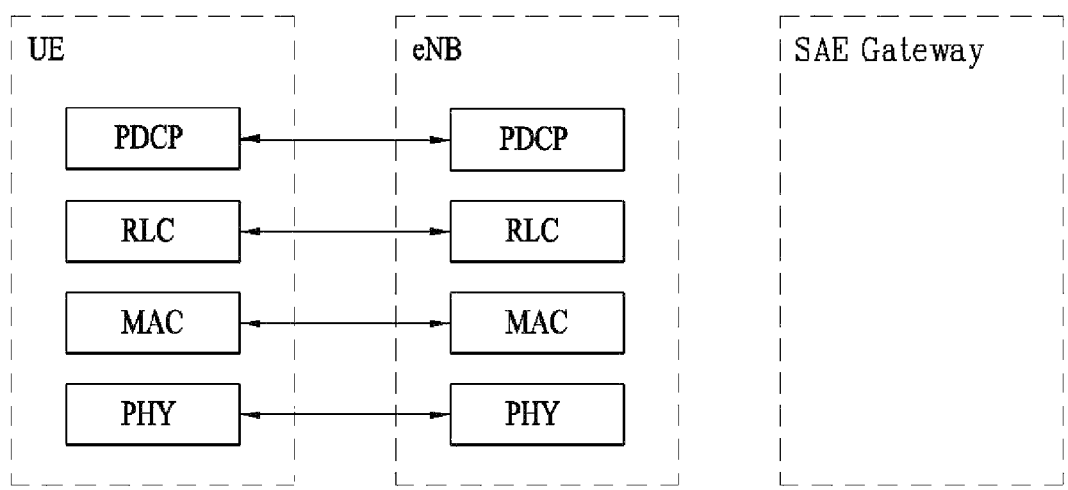
(B) USER-PLANE PROTOCOL STACK (a) CONVENTIONAL ANTENNA SYSTEM  (b) AAS

METHOD FOR TRANSMITTING SIGNAL USING TERMINAL MOBILITY-BASED PRECODER CYCLE TECHNIQUE, AND APPARATUS THEREFOR

CROSS REFERENCE TO RELATED APPLICATIONS

This application is the National Phase of PCT International Application No. PCT/KR2015/003171, filed on Mar. 31, 2015, which claims priority under 35 U.S.C. 119(e) to U.S. Provisional Application No. 62/028,786, filed on Jul. 24, 2014, all of which are hereby expressly incorporated by reference into the present application.

TECHNICAL FIELD

The present invention relates to a wireless communication system and, more particularly, to a method of transmitting a signal using a user equipment (UE) mobility-based precoder cycling technique in a wireless communication system and an apparatus therefor.

BACKGROUND ART

As an example of a mobile communication system to which the present invention is applicable, a 3rd Generation Partnership Project Long Term Evolution (hereinafter, referred to as "LTE") communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells is present per eNB. A cell is configured to use one of bandwidths of 1.25, 2.5, 5, 10, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface for transmitting user traffic or control traffic may be used between eNBs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above description, hereinafter, a method of transmitting a signal using a UE mobility-based precoder cycling technique in a wireless communication system and an apparatus therefor will be proposed.

Technical Solution

The object of the present invention can be achieved by providing a method of transmitting a signal from a transmission end to a reception end in a wireless communication system including composing a precoder set including one or more precoders, cycling and applying the one or more precoders in specific resource units to precode the signal and transmitting the precoded signal to the reception end, wherein at least one of a size of the precoder set and the one or more precoders is determined based on mobility of the reception end.

A beam width of the precoded signal when the mobility of the reception end is high may be greater than width of the precoded signal when the mobility of the reception end is low.

Additionally, the composing the precoder set may include receiving information on at least one preferred precoder from the reception end and selecting one or more precoders based on the at least one preferred precoder. Alternatively, the composing the precoder set may include selecting at least one specific precoder based on the mobility of the reception end and selecting one or more precoders based on the at least one specific precoder.

Alternatively, the composing the precoder set may include receiving information on at least one preferred precoder from the reception end, setting a reference precoder set within a predetermined beamforming angle range based on the at least one preferred precoder, and composing the precoder set from the reference precoder set based on the mobility of the reception end.

The method may further include transmitting information on the precoder set to the reception end, and the information on the precoder set may include sorting information of the one or more precoders included in the precoder set.

In another aspect of the present invention, provided herein is a transmission apparatus in a wireless communication system including a processor configured to compose a precoder set including one or more precoders and to cycle and apply the one or more precoders in specific resource units to precode the signal and a wireless communication module configured to transmit the precoded signal to a reception apparatus, wherein the processor determines at least one of a size of the precoder set and the one or more precoders based on mobility of the reception apparatus.

A beam width of the precoded signal when the mobility of the reception end is high may be greater than that of the precoded signal when the mobility of the reception end is low.

Additionally, the processor may select one or more precoders based on at least one preferred precoder received from the reception apparatus. Alternatively, the processor may select one or more precoders based on at least one specific precoder selected based on the mobility of the reception apparatus.

Alternatively, the processor may set a reference precoder set within a predetermined beamforming angle range based on at least one preferred precoder received from the reception apparatus and compose the precoder set from the reference precoder set based on the mobility of the reception apparatus.

Information on the precoder set may be provided to the reception apparatus, and the information on the precoder set may include sorting information of the one or more precoders included in the precoder set.

Advantageous Effects

According to the present invention, a base station can adaptively and more efficiently perform beamforming based on mobility of a user equipment (UE) in a wireless communication system.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

FIG. 2 is a view illustrating structures of a control plane and a user plane of a radio interface protocol between a UE and an E-UTRAN based on the 3GPP radio access network specification;

BEST MODE

Figure 1:
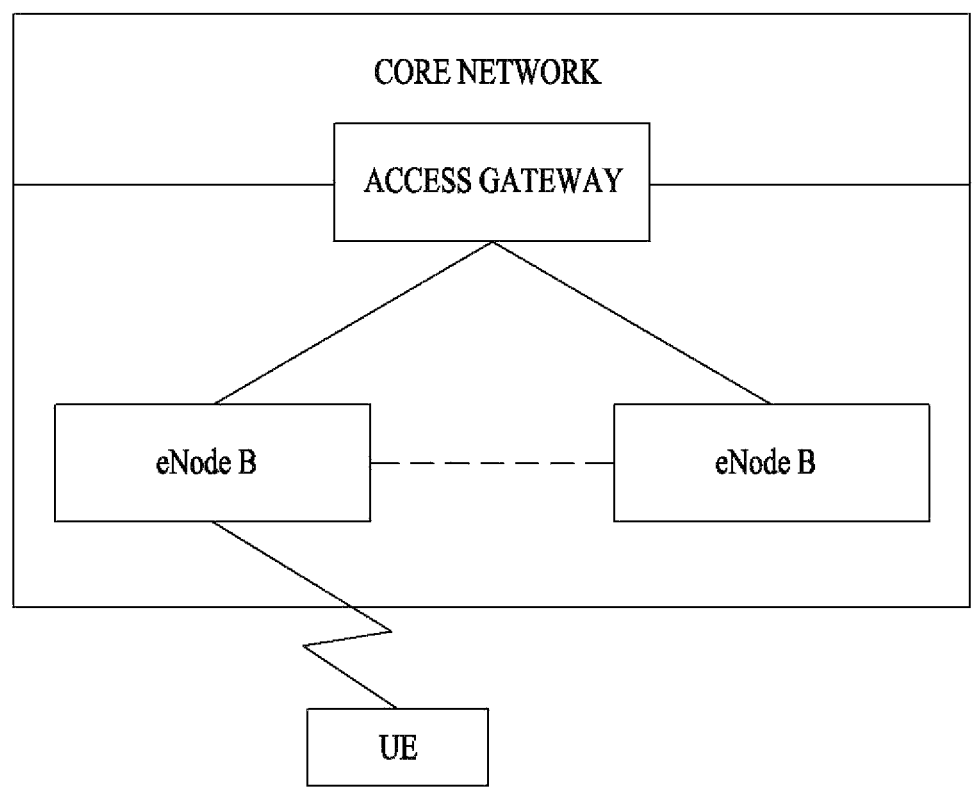
FIG. 1 is a view schematically illustrating a network structure of an E-UMTS as an exemplary radio communication system.

Hereinafter, structures, operations, and other features of the present invention will be understood readily from the embodiments of the present invention, examples of which are illustrated in the accompanying drawings. Embodiments described later are examples in which technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems in accordance with the aforementioned definition. In addition, although the embodiments of the present invention will herein be described based on FDD mode, the FDD mode is only exemplary and the embodiments of the present invention can easily be applied to H-FDD mode or TDD mode.

In addition, in the present specification, the term "base station" may include a remote radio head (RRH), an eNB, a transmission point (TP), a reception point (RP), a relay, etc.

FIG. 2 is a view illustrating structures of a control plane and a user plane of a radio interface protocol between a UE and an E-UTRAN based on the 3GPP radio access network specification. The control plane refers to a path used for transmitting control messages, which are used by a User Equipment (UE) and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. Radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
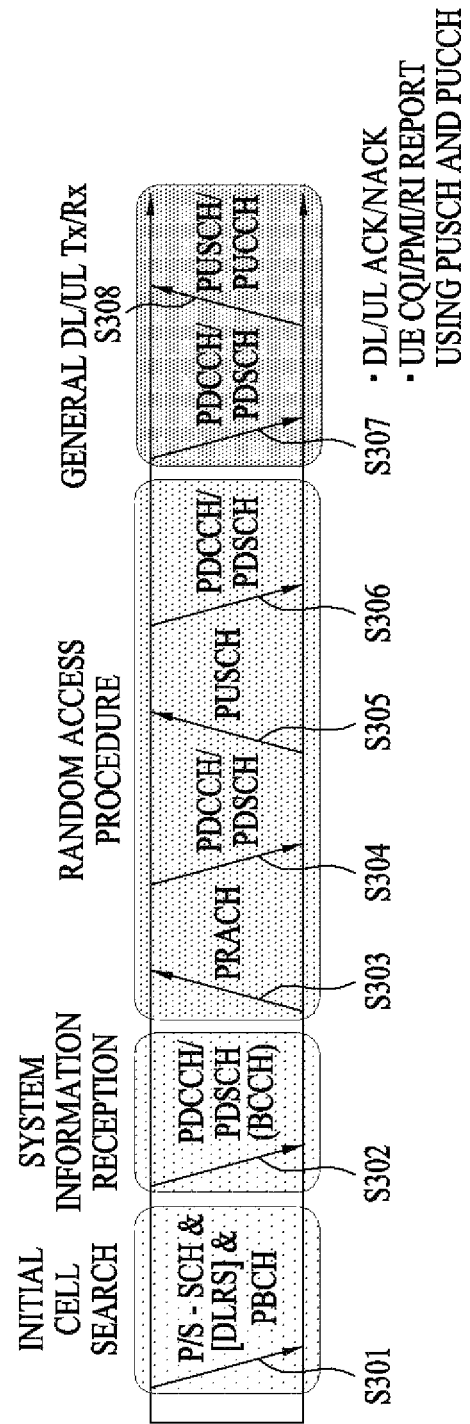
FIG. 3 is a view illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
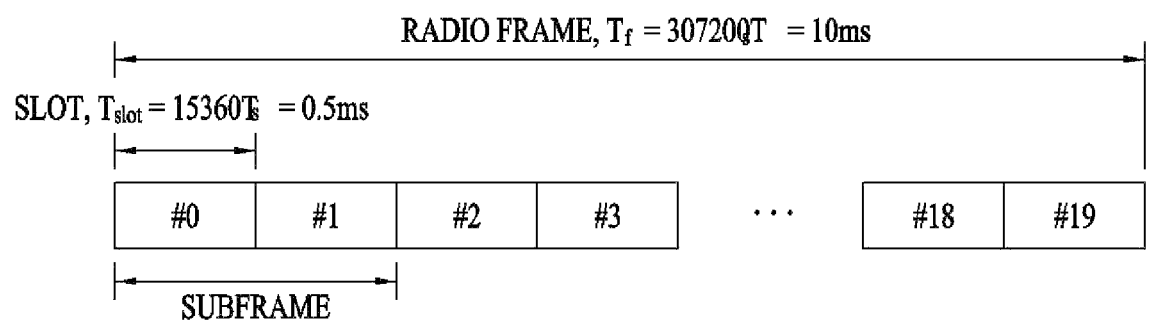
FIG. 4 is a view illustrating the structure of a radio frame used in an LTE system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by $Ts=1/(15\ kHz \times 2048)=3.2552 \times 10-8$ (about 33 ns). Each slot includes a plurality of OFDM symbols in a time domain and includes a plurality of resource blocks in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
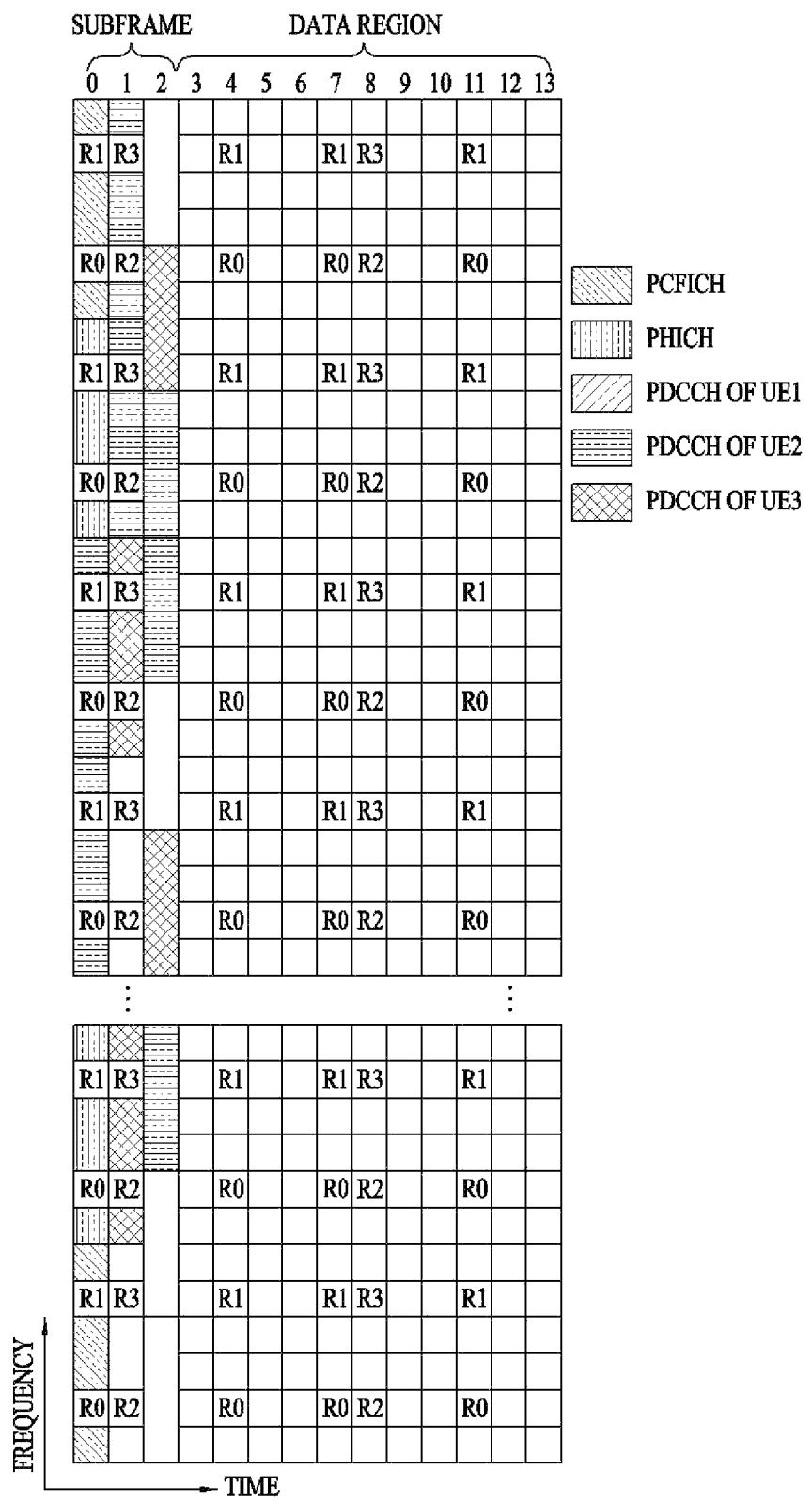
FIG. 5 is a view illustrating the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to a subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier x one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. The PCH and the DL-SCH are transmitted through the PDSCH. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) 'A' and information about data, that is transmitted using radio resources 'B' (e.g., frequency location) and transport format information 'C' (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
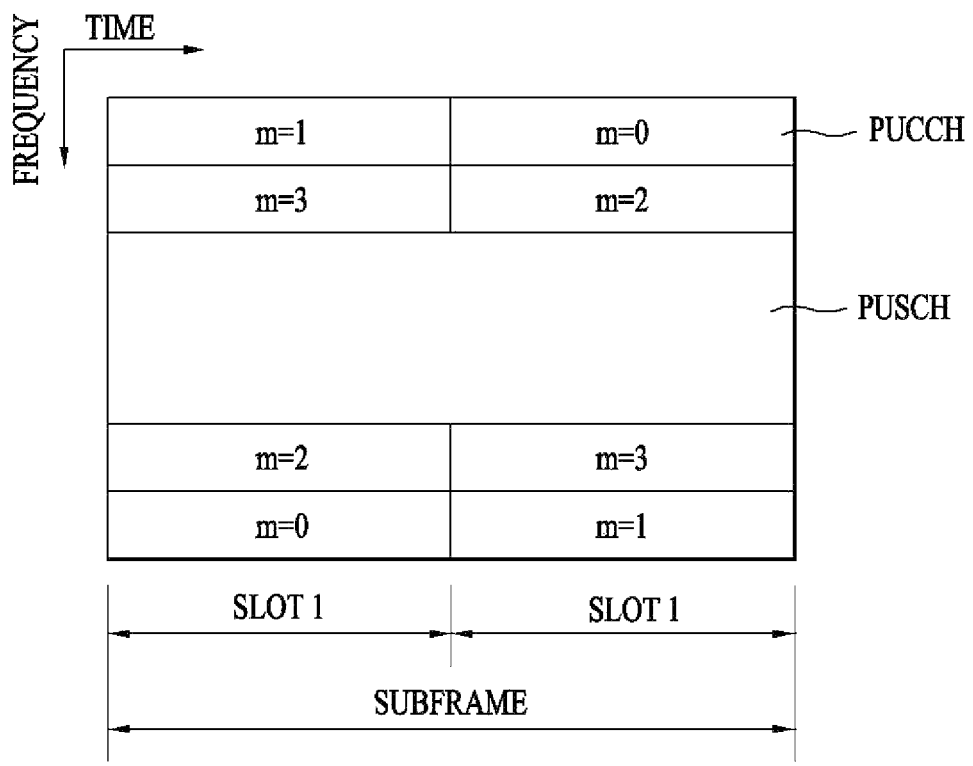
FIG. 6 is a view illustrating the structure of an uplink subframe used in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
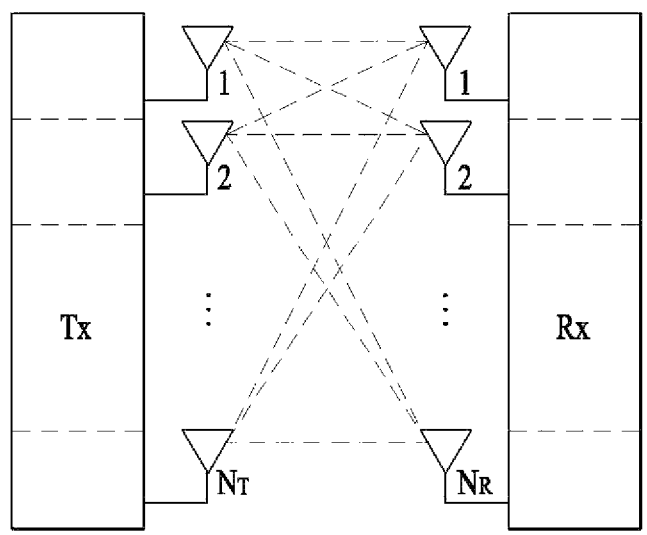
FIG. 7 is a view illustrating the configuration of a general MIMO communication system.

The configuration of a general MIMO communication system is shown in FIG. 7. A transmitting end is equipped with NT transmission (Tx) antennas and a receiving end is equipped with NR reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is Ro, a transfer rate using multiple antennas can be theoretically increased by the product of the maximum transfer rate Ro by a rate increment Ri. The rate increment Ri is represented by the following equation 1 where Ri is the smaller of NT and NR.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that NT Tx antennas and NR Rx antennas are present. In the case of a transmission signal, a maximum number of transmittable pieces of information is NT under the condition that NT Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel State Information (CSI) report is given. In the current LTE standard, a MIMO transmission scheme is categorized into open-loop MIMO operated without channel information and closed-loop MIMO operated based on channel information. Especially, according to the closed-loop MIMO system, each of the eNB and the UE may be able to perform beamforming based on CSI to obtain a multiplexing gain of MIMO antennas. To obtain CSI from the UE, the eNB transmits an RS to the UE and commands the UE to feedback CSI measured based on the RS through a PUCCH or a PUSCH.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

According to determination of LTE-A standard, a final PMI is designed as W1, which a long-term and/or wideband PMI, and W2, which is a short-term and/or subband PMI.

An example of a hierarchical codebook transform scheme configuring one final PMI from W1 and W2 may use a long-term covariance matrix of a channel as indicated in Equation 8.

$$W = \text{norm}(W1 W2) \quad \text{[Equation 8]}$$

In the above equation, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9.

$$w1(i) = \begin{bmatrix} x_i & 0 \\ 0 & x_i \end{bmatrix}, \text{ where } x_i \text{ is } Nt/2 \text{ by } M \text{ matrix.} \quad \text{[Equation 9]}$$

$$w2(j) = \overbrace{\begin{bmatrix} e_M^k & e_M^l & e_M^m \\ & & \cdots & \\ \alpha_j e_M^k & \beta_j e_M^l & \gamma_j e_M^m \end{bmatrix}}^{r \text{ columns}} \text{ (if rank = } r\text{),}$$

where $1 \leq k, l, m \leq M$ and $k, l, m$ are integer.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows.

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of the number of Tx antennas, i.e. a vector of $N_T \times 1$, and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

Hereinafter, an active antenna system (AAS) and three-dimensional beamforming will be described.

In an existing cellular system, an eNB has used a method of reducing inter-cell interference using mechanical tilting or electrical tilting and improving throughput of UEs in a cell, e.g., a signal to interference plus noise ratio (SINR), which will be described in greater detail with reference to the figures.

Figure 8:
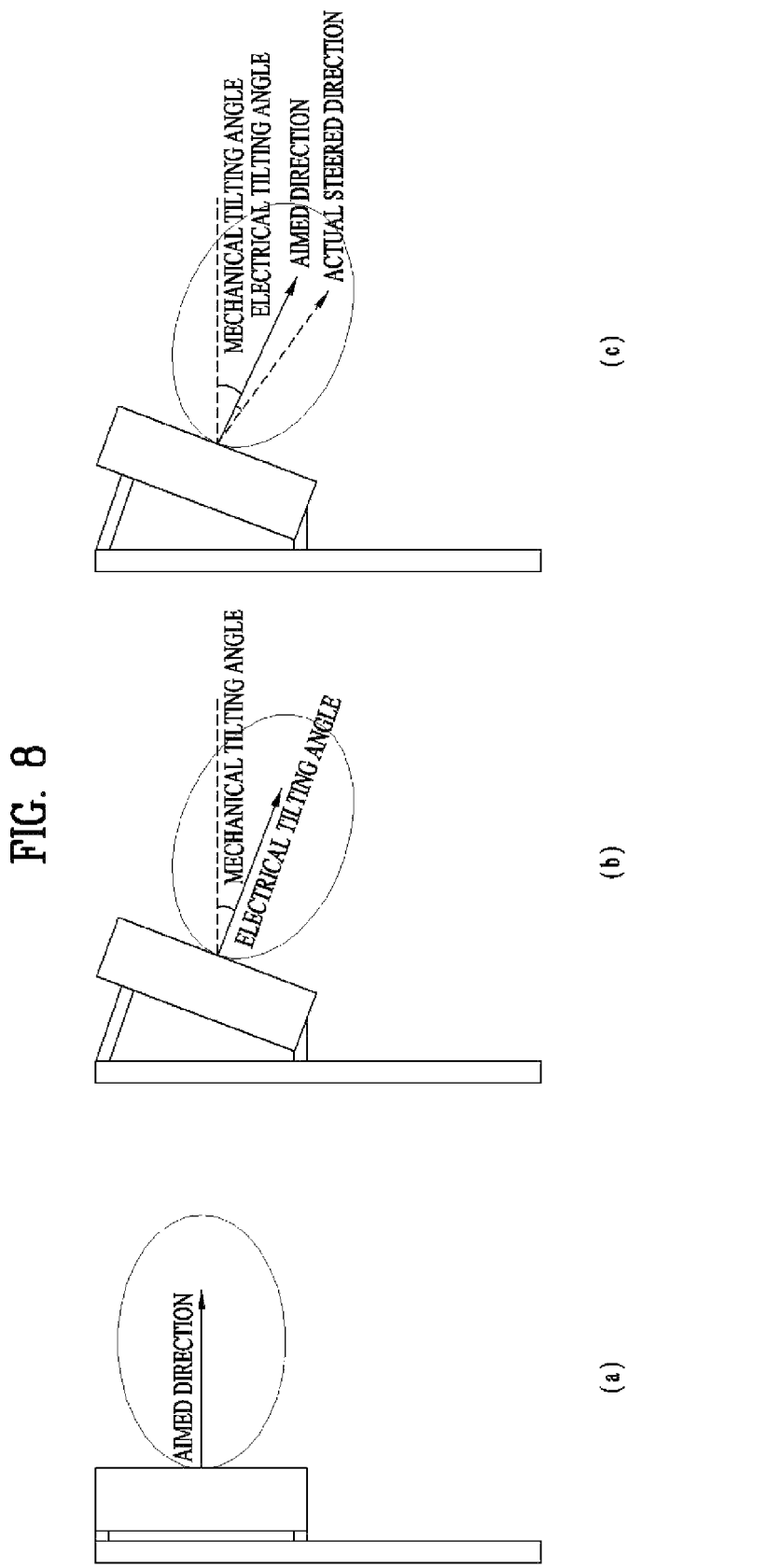
FIG. 8 is a diagram illustrating an antenna tilting scheme.

FIG. 8 is a diagram illustrating an antenna tilting method. In particular, FIG. 8(a) shows an antenna structure, to which antenna tilting is not applied, FIG. 8(b) shows an antenna structure, to which mechanical tilting is applied, and FIG. 8(c) shows an antenna structure, to which both mechanical tilting and electrical tilting are applied.

Comparing FIG. 8(a) with FIG. 8(b), when mechanical tilting is applied, a beam direction is fixed upon initial installation as shown in FIG. 8(b). Further, when electrical tilting is applied, as shown in FIG. 8(c), a tilting angle may be changed using an internal phase shift module but only restrictive vertical beamforming is possible due to cell-fixed tilting.

Figure 9:
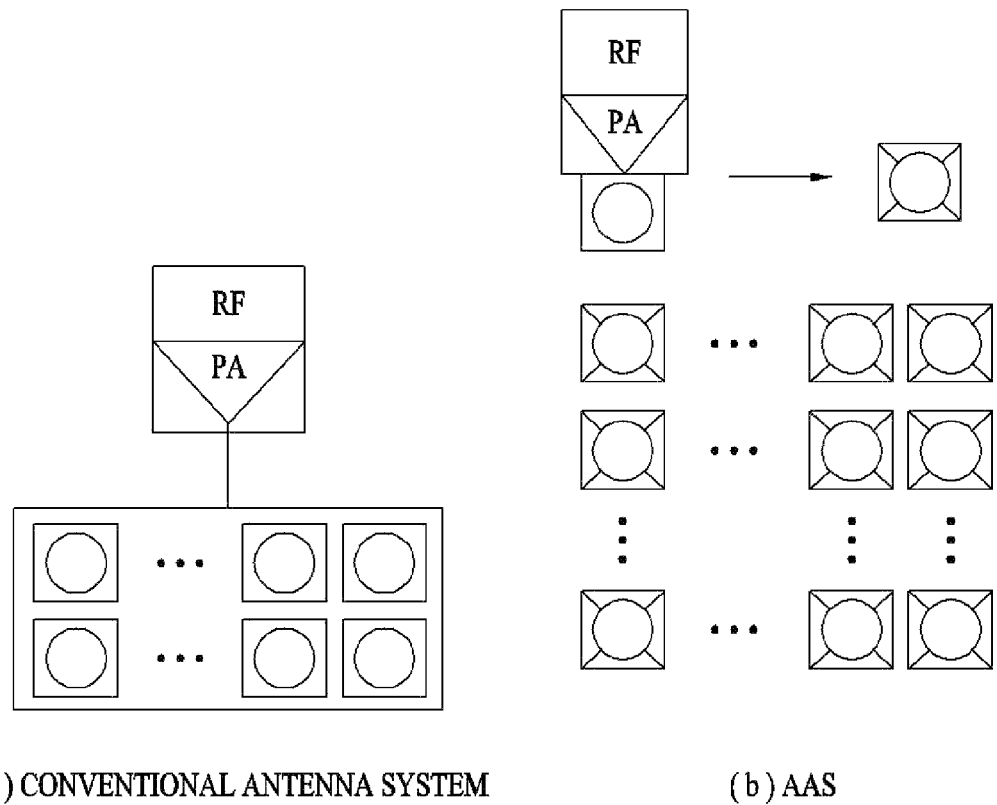
FIG. 9 is a diagram showing comparison between a conventional antenna system and an active antenna system.

FIG. 9 is a diagram showing comparison between a conventional antenna system and an active antenna system. In particular, FIG. 9(a) shows a conventional antenna system and FIG. 9(b) shows an active antenna system.

Referring to FIG. 9, unlike the conventional antenna system, the active antenna system is characterized in that power and phase adjustment of each antenna module is possible because each of a plurality of antenna modules includes an RF module including a power amplifier, that is, an active element.

As a general MIMO antenna structure, a linear antenna array, that is, a one-dimensional antenna array, such as a uniform linear array (ULA), was considered. In the one-dimensional array structure, beams which may be formed by beamforming are present in a two-dimensional plane. This is applied to a passive antenna system (PAS)-based MIMO structure of a conventional base station. Although vertical antennas and horizontal antennas are present even in a PAS based base station, the vertical antennas are fixed to one RF module and thus beamforming is impossible in a vertical direction and only mechanical tilting is applicable.

However, as an antenna structure of a base station has evolved into an active antenna system, independent RF modules may be implemented in vertical antennas and thus beamforming is possible not only in a horizontal direction but also in a vertical direction. This is referred to as vertical beamforming or elevation beamforming.

According to vertical beamforming, since formable beams may be expressed in three-dimensional space in vertical and horizontal directions, vertical beamforming may be referred to as three-dimensional beamforming. That is, three-dimensional beamforming becomes possible by evolution from a one-dimensional antenna array structure to a two-dimensional planar antenna array structure. Three-dimensional beamforming is possible not only in a planar antenna array structure but also in a ring-shaped three-dimensional array structure. Three-dimensional beamforming is characterized in that a MIMO process is performed in a three-dimensional space because various antenna structures may be used in addition to the one-dimensional antenna array structure.

Figure 10:
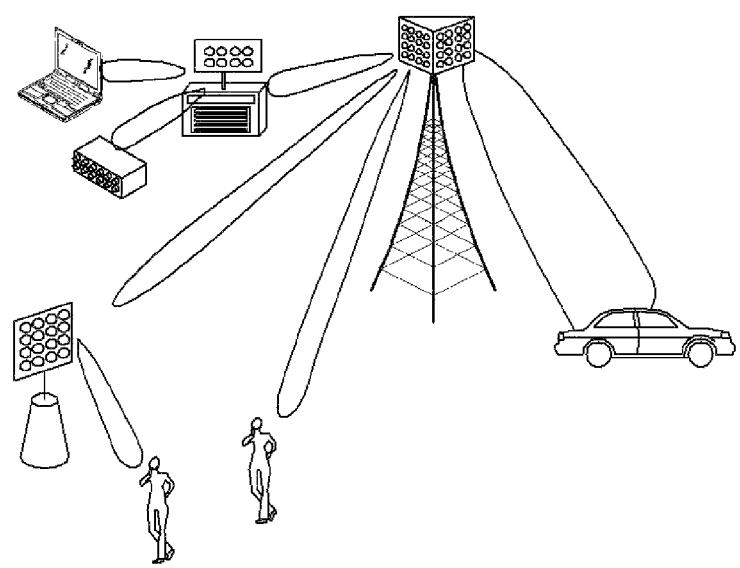
FIG. 10 is a diagram showing an example of forming a UE-specific beam based on an active antenna system.

FIG. 10 is a diagram showing an example of forming a UE-specific beam based on an active antenna system. Referring to FIG. 10, due to three-dimensional beamforming, beamforming is possible not only when a UE moves from side to side but also when a UE moves back and forth, thereby providing a higher degree of freedom to UE-specific beamforming.

Further, as a transmission environment using a two-dimensional antenna array structure based on an active antenna, an environment in which an outdoor eNB transmits a signal to an outdoor UE, an environment in which an outdoor eNB transmits a signal to an indoor UE (outdoor to indoor; O2I) and an environment in which an indoor eNB transmits a signal to an indoor UE (indoor hotspot) may be considered.

Figure 11:
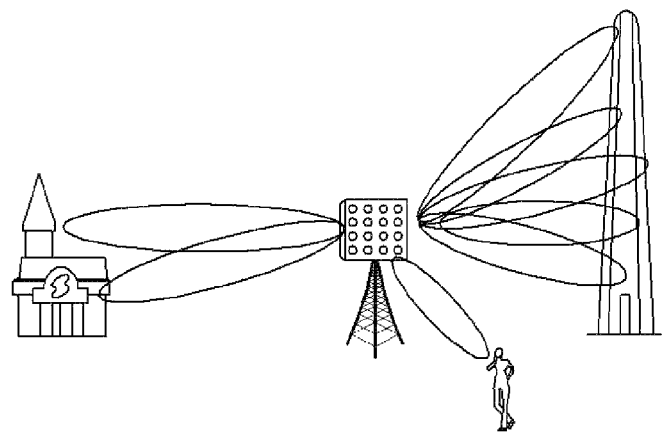
FIG. 11 is a diagram showing a 3-dimensional (3D) beam transmission scenario based on an active antenna system.

FIG. 11 is a diagram showing a 3-dimensional (3D) beam transmission scenario based on an active antenna system.

Referring to FIG. 11, in an actual cell environment in which a plurality of buildings is present per cell, an eNB needs to consider vertical beam steering capabilities considering various UE heights due to building heights as well as UE-specific horizontal beam steering. In such a cell environment, channel properties different from those of an existing radio channel environment, e.g., shadow/path loss change due to height difference, fading property change, etc. need to be considered.

In other words, thee-dimensional beamforming is evolved from horizontal beamforming performed based on a one-dimensional linear antenna array structure and refers to a MIMO processing scheme which is an extension to or a combination with elevation beamforming or vertical beamforming based on an antenna structure of a multi-dimensional array, such as a planar antenna array, or a massive antenna array.

The massive antenna array has one or more of the following characteristics. That is, i) the massive antenna array is located on a two-dimensional (2D) plane or in a 3D space, ii) the number of logical or physical antennas is eight or more (here, the logical antenna may be expressed by an antenna port) and iii) each antenna is composed of an AAS. However, definition of the massive antenna array is not limited thereto. Hereinafter, various beamforming schemes using a massive antenna array will be described.

a) Partial antenna array based beamforming applied to a 3D beamforming environment is referred to as beam-width adaptation (BA) beamforming, which has the following features.

Figure 12:
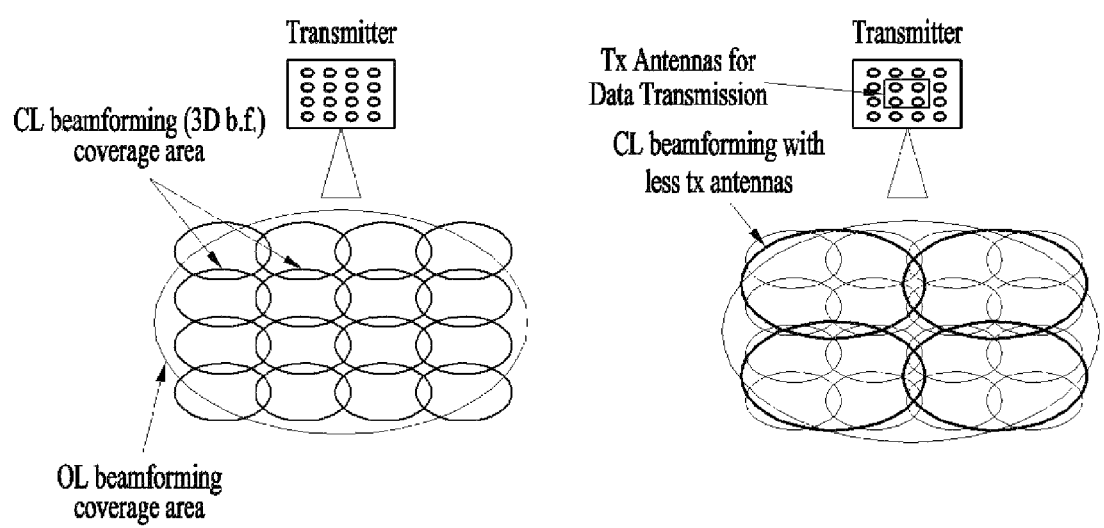
FIG. 12 is a diagram showing comparison in beam coverage between a conventional MIMO transmission scheme and a BA beamforming scheme.

In the BA beamforming scheme, the number of antennas participating in data transmission is adjusted according to the velocity of a UE to adjust a transmission beam width. FIG. 12 is a diagram showing comparison in beam coverage between a conventional MIMO transmission scheme and a BA beamforming scheme. In particular, the left side of FIG. 12 shows the conventional MIMO transmission scheme and the right side thereof shows the BA beamforming scheme.

Referring to the left side of FIG. 12, in a 4×4 antenna array, if a UE moves at a medium velocity, the width of a beam transmitted by the 4×4 antenna array is too narrow to obtain channel accuracy. Since an open-loop scheme covers the entirety of cell coverage, the beam width may be excessively wide. As shown in the right side of FIG. 12, if only two 2×2 central antenna arrays participate in transmission, a beam having a relatively wide beam width and capable of obtaining beam gain may be generated. That is, the number of antennas participating in transmission to the UE is reduced according to the velocity of the UE to increase the beam width, thereby acquiring beam gain lower than that of closed-loop beamforming but higher than that of open-loop beamforming.

b) If the beam width is adjusted according to mobility of the UE in the BA beamforming scheme, a method for performing beamforming in any one of a vertical or horizontal direction and performing open loop precoding in the other direction according to the movement direction of the UE may also be considered. This technology is referred to as dimension adaptation (DA) beamforming because 2D beamforming may be performed in a 3D beamforming environment.

Figure 13:
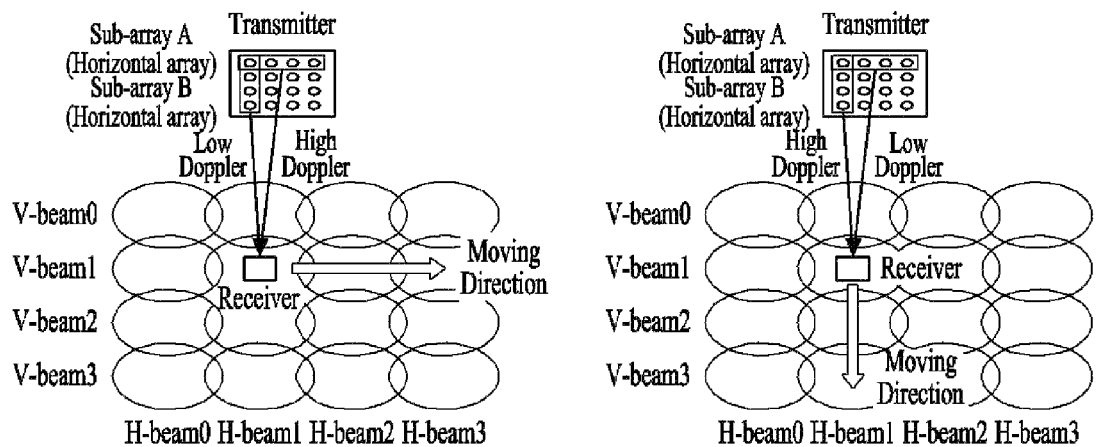
FIG. 13 is a diagram showing the concept of a DA beamforming scheme.

The DA beamforming scheme is a beamforming scheme for, at an eNB, applying an open-loop scheme to the direction, in which movement of the UE is high, that is, the direction, in which the Doppler effect is high, of the vertical direction and the horizontal direction and applying a closed-loop scheme to the other direction. FIG. 13 is a diagram showing the concept of a DA beamforming scheme. In particular, the left side of FIG. 13 shows the case in which a UE moves in a horizontal direction and the right side thereof shows the case in which a UE moves in a vertical direction.

Figure 14:
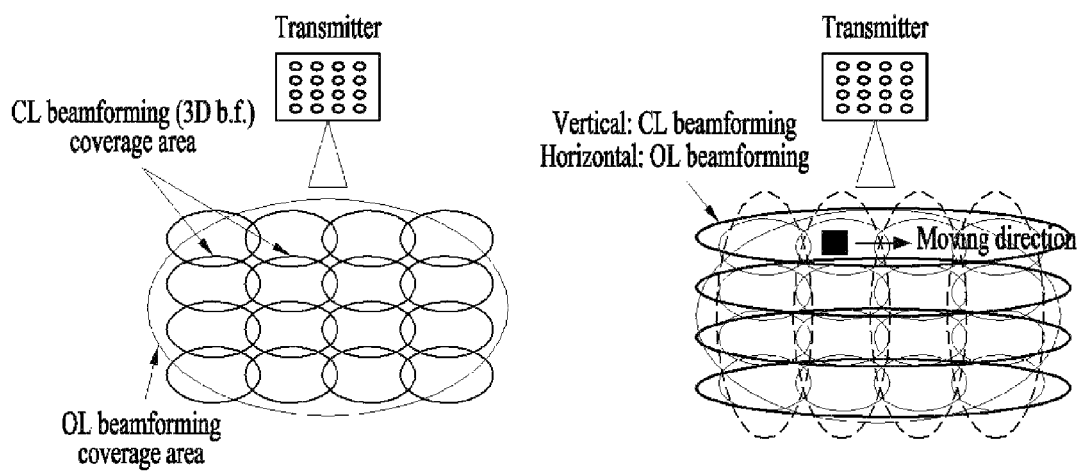
FIG. 14 is a diagram showing the features of a DA beamforming scheme.

FIG. 14 is a diagram showing the features of a DA beamforming scheme.

Figure 15:
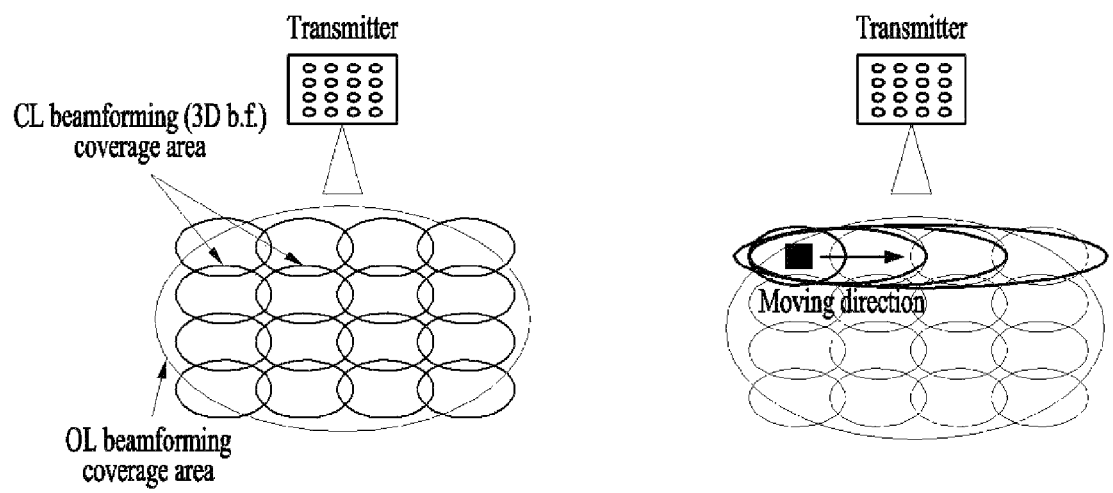
FIG. 15 is a diagram showing the concept of a DBA beamforming scheme.

If a DA beamforming scheme is used, beam gain can be obtained in a direction in which the Doppler effect is low but cannot be obtained in a direction in which the Doppler effect is high. Accordingly, in an area in which a beam is formed, a beam having a narrow width is formed in one of a horizontal direction and a vertical direction as shown in FIG. 14. Accordingly, it is possible to provide beam gain having a predetermined level to a UE moving in a specific direction.

c) Dimension and beam-width adaptation (DBA) which is a combination of a BA beamforming scheme and a DA beamforming scheme may also be considered. FIG. 15 is a diagram showing the concept of a DBA beamforming scheme.

The DBA beamforming scheme is a combination of a DA beamforming scheme and a BA beamforming scheme. Referring to FIG. 15, if a UE moves in a vertical or horizontal direction upon applying the DBA beamforming scheme, closed-loop beamforming is performed in a direction in which the Doppler effect is low, that is, in a direction orthogonal to the movement direction of a UE, and the number of antennas participating in transmission is adjusted according to the velocity of the UE to adjust a beam width in a direction in which the Doppler effect having a predetermined level is present.

In summary, as shown in Table 1, the DA beamforming scheme is suitable when a UE moves at a high velocity in a specific direction with respect to an eNB, the BA beamforming scheme is suitable when a UE moves at a low velocity or a medium velocity, and the DBA beamforming scheme is suitable when a UE moves in a specific direction at a low velocity or a medium velocity.

TABLE 1

| | |
|---|---|
| Dimension adaptation (DA) beamforming | A UE moves at a high velocity in a vertical or horizontal direction with respect to an eNB. |
| Beam-width adaptation beamforming | Low-velocity or medium-velocity movement environment |
| DBA beamforming (DA + BA | A UE moves in a vertical or horizontal direction with respect to an eNB at a low velocity or a medium velocity. |

BA beamforming or DBA beamforming are characterized in that a beam width is controlled according to channel variation properties and, more particularly, UE mobility, that is, velocity of a UE. Antenna ON/OFF or per-antenna transmit power and phase control technology may be used as means for controlling the beam width. The present invention proposes a precoder cycling scheme having a restricted beamforming range as means for controlling the beam width. The precoder cycling scheme of the present invention is characterized in that beam coverage by precoder cycling becomes narrow as the velocity of the UE decreases and becomes wide as the velocity of the UE increases. Here, beam coverage may mean a range of a beamforming angle of a cycled precoder.

More specifically, in the present invention, an eNB composes a UE-specific precoder set and alternately applies precoders included in the precoder set in specific time/frequency units according to preferred precoder related feedback information and time-varying channel variation properties of a UE.

Examples of the preferred precoder related feedback information of the UE may include PMI feedback information.

The eNB may measure the properties of an uplink signal or measure change in the location or channel-related information (e.g., PMI, CQI, etc.) of the UE according to time, thereby obtaining the time-varying channel variation properties of the UE. Alternatively, the UE may feed back time-varying channel variation properties (e.g., Doppler frequency, the velocity of the UE, a coherence time, etc.), thereby obtaining the time-varying channel variation properties of the UE. In addition, the specific time/frequency unit is a symbol, a subframe, a frame, etc. on a time axis and is a subcarrier, a resource block, a resource block group, etc. on a frequency axis.

Additionally, some of the precoders included in the precoder set proposed by the present invention may not be included in a PMI codebook for accurate valid beam width control. That is, a precoder which is not defined in a PMI codebook is applicable to the precoder set.

Hereinafter, a method of composing a UE-specific precoder set proposed by the present invention will be described. For convenience of description, the UE-specific precoder set is expressed by $X_1, \ldots X_N$.

First Embodiment

First, in a first embodiment of the present invention, the precoders included in the precoder set may be determined according to UE channel variation properties. More specifically, the first embodiment may be divided into a single-PMI based precoder determination scheme and a multi-PMI based precoder determination scheme.

(1) According to the single-PMI based precoder determination scheme, a precoding matrix $X_i$ may be expressed as shown in Equation 11 below.

$X_i = f_i(P)$ [Equation 11]

In Equation 11 above, a matrix P is a precoding matrix corresponding to a selected PMI and has a size of $N_t \times N_s$. Here, $N_t$ denotes the number of transmit antennas and $N_s$ denotes the number of layers. In addition, $f_i( )$ means a transformation function corresponding to an i-th precoding matrix and is determined according to the channel variation properties of the UE.

For example, the precoding matrix $X_i$ may be composed as shown in Equation 12 below.

$X_i = R_i P$ [Equation 12]

$R_i = \text{diag}([\exp(j\alpha_{i,1})\exp(j\alpha_{i,2}) \ldots \exp(j\alpha_{i,N_t})])$ In Equation 12 above, $R_i$ is a phase change matrix and may be defined as a diag( ) function for transforming a vector having a size of N×1 into a diagonal matrix having a size of N×N.

In addition, $\alpha_{i,n}$ denotes phase change of an n-th antenna. In the case of a uniform linear array (ULA), $\alpha_{i,n} = 2\pi n d(n-1)\theta_i$ may be set to apply linear phase change. Here, d denotes a distance between antennas in wavelength units and $\theta_i$ may have a range of $-X \leq \theta_i \leq X$ using X which is a factor determined based on the velocity of the UE.

(2) Next, according to the multi-PMI based precoder determination scheme, a precoding matrix $X_i$ may be expressed as shown in Equation 13 below.

$X_i = f_i(P_1, \ldots, P_M)$ [Equation 13]

In Equation 13, a matrix $P_j$, i=1, ..., M refers to M (M≤N) precoding matrices included in a PMI codebook. M PMIs may be composed of $M_1$ PMIs fed back by the UE and $M-M_1$ PMIs selected by the eNB in consideration of UE channel variation. Of course, $M_1$ may be 1. In addition, $f_i( )$ means a composition and transformation function corresponding to an i-th precoding matrix. Here, the number M of PMIs selected by the UE and/or $f_i( )$ are determined according to the channel variation properties of the UE.

For example, if M is 2, $X_i = \alpha_i P_1 + (1-\alpha_i)P_2$ ($\alpha_i$ being a value between 0 and 1). As another example, if M is 2, $X_i = R_i P_1 \otimes G_i P_2$. Here, $\otimes$ denotes an element-wise product and $R_i$ and $G_i$ indicate phase change matrices.

As another example, if N is 4, $X_i$ may be composed according to the value M, that is, mobility of the UE as shown in Table 2.

TABLE 2

|  | $X_1$ | $X_2$ | $X_3$ | $X_4$ |
| --- | --- | --- | --- | --- |
| $M_{=1}$ (Low mobility UE) | $P_1$ | $P_1$ | $P_1$ | $P_1$ |
| $M_{=2}$ (Mid mobility UE) | $P_1$ | $P_2$ | $P_1$ | $P_2$ |
| $M_{=4}$ (High mobility UE | $P_1$ | $P_2$ | $P_3$ | $P_4$ |

Instead of the above scheme, a scheme of adaptively changing the size N of a precoder set according to the time-varying channel variation properties of the UE based on a reference precoder set, which is set regardless of the time-varying channel variation properties of the UE, is applicable.

Second Embodiment

In a second embodiment of the present invention, the size of a precoder set may be determined according to the channel variation properties of the UE. More specifically, in the second embodiment, the precoder set may be determined as follows.

First step: A transmitter pre-composes UE-specific reference precoder sets of a predetermined number from -X degrees to +X degrees (e.g., 100) of a PMI preferred by a UE. Here, X may be a predefined value.

Second step: Some precoders of the reference precoder set are set as a precoder set according to channel variation. For example, only beams included in the range from -Y degrees to +Y degrees are selected. Here, Y is less than X and may be determined according to the velocity of the UE.

Although an example of generating the UE-specific reference precoder sets is described in the first step, a reference precoder set predefined by a system or a network may be used as the reference precoder set. In this case, in the second step, a subset is composed in the reference precoder set according to the preferred PMI and channel variation of the UE to determine a precoder set to be applied to data transmission to the UE.

Figure 16:
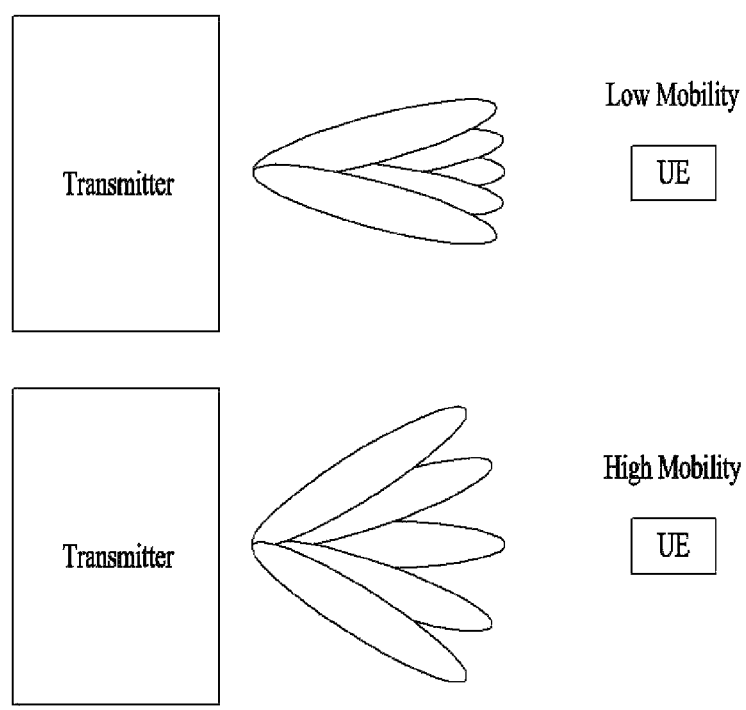
FIGS. 16 and 17 are diagrams showing a difference between a first embodiment and a second embodiment of the present invention.
Figure 17:
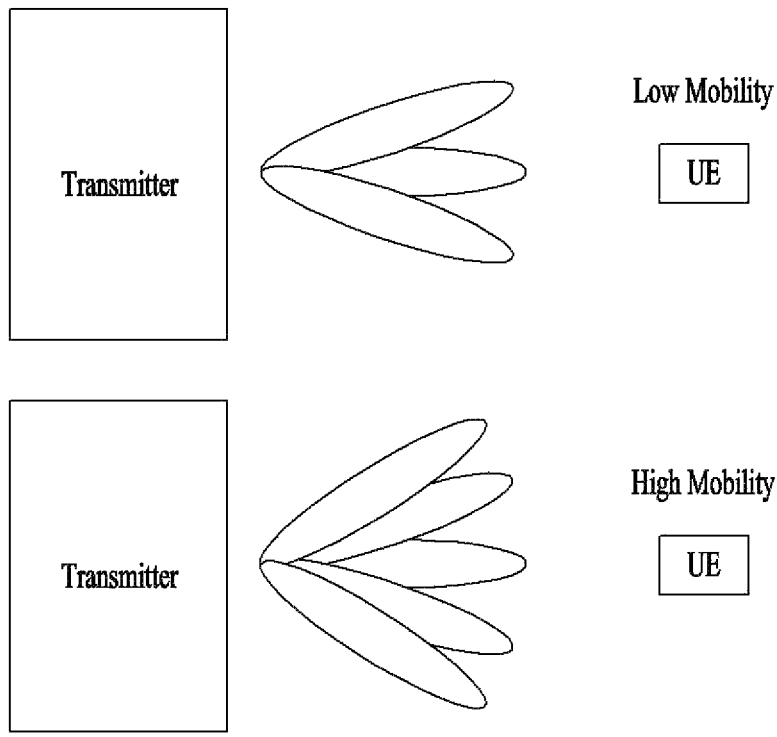

FIGS. 16 and 17 are diagrams showing a difference between a first embodiment and a second embodiment of the present invention.

FIG. 16 shows the beamforming scheme according to the first embodiment on the assumption that the number N of precoders included in the precoder set is 5. In this case, according to FIG. 16, it can be seen that the beam widths obtained by the five precoders when a UE moves at a low velocity are less than those obtained by the five precoders when a UE moves at a high velocity.

In addition, FIG. 17 shows the beamforming scheme according to the second embodiment. It can be seen that the number of precoders included in the precoder set when the UE moves at a low velocity is 3 and is less than 5 which is the number of precoders included in the precoder set when the UE moves at a high velocity.

The single-PMI based precoder determination scheme and the multi-PMI based precoder determination scheme may be used in both the first and second embodiments.

Figure 18:
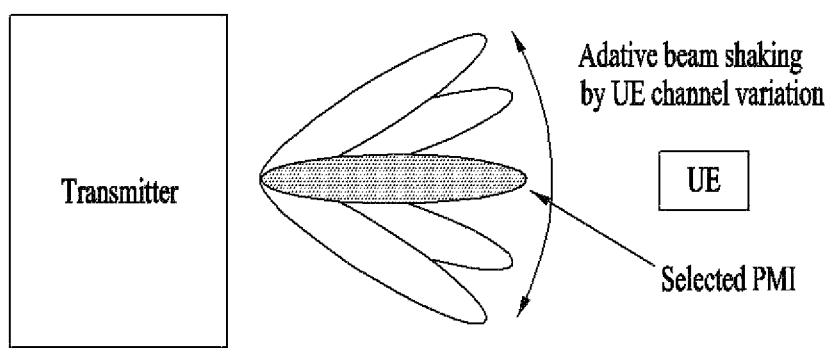
FIG. 18 is a diagram showing the concept of a single-PMI based precoder determination scheme according to the present invention.

FIG. 18 is a diagram showing the concept of a single-PMI based precoder determination scheme according to the present invention.

Referring to FIG. 18, a precoder set is generated based on a PMI selected by a UE or an eNB (from a predefined codebook) and precoders included in the precoder set are alternately used per resource, thereby obtaining beam gain of a predetermined value or more even in a Doppler environment and an environment in which a user channel is changed. Here, as a method of selecting a PMI, 1) a method of using a PMI selected and reported by a UE, 2) a method of determining a PMI at an eNB through an uplink measurement channel and 3) a method of selecting a PMI obtained by correcting a PMI obtained through one of the above-described methods using UE mobility information may be considered.

Figure 19:
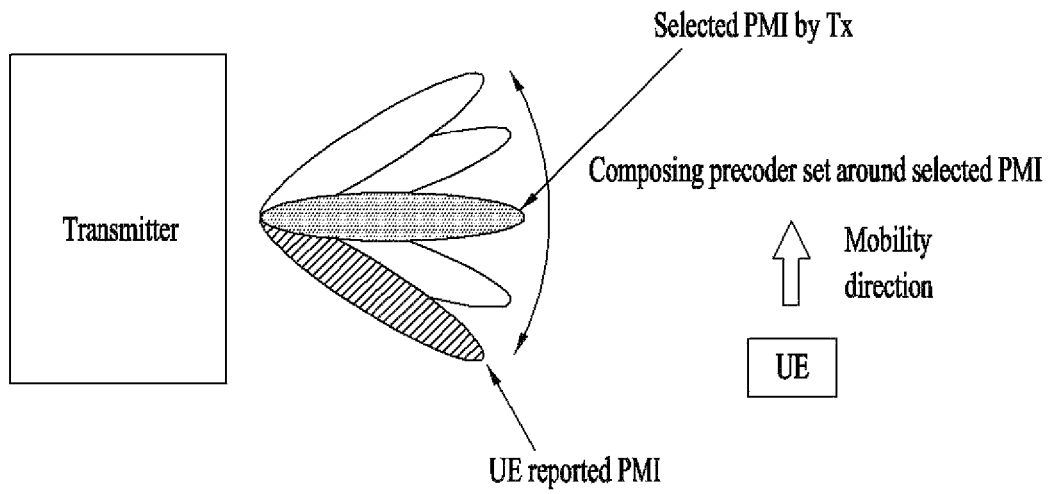
FIG. 19 is a diagram showing an example of a single-PMI based precoder determination scheme according to the present invention.

FIG. 19 is a diagram showing an example of a single-PMI based precoder determination scheme according to the present invention. In particular, assume that the method of 3) is applied to FIG. 19.

Referring to FIG. 19, an eNB may correct a PMI selected and reported by a UE using mobility information to select a PMI and generate a precoder set based on the selected PMI. To this end, technology for predicting channel variation of the UE may be further required.

Figure 20:
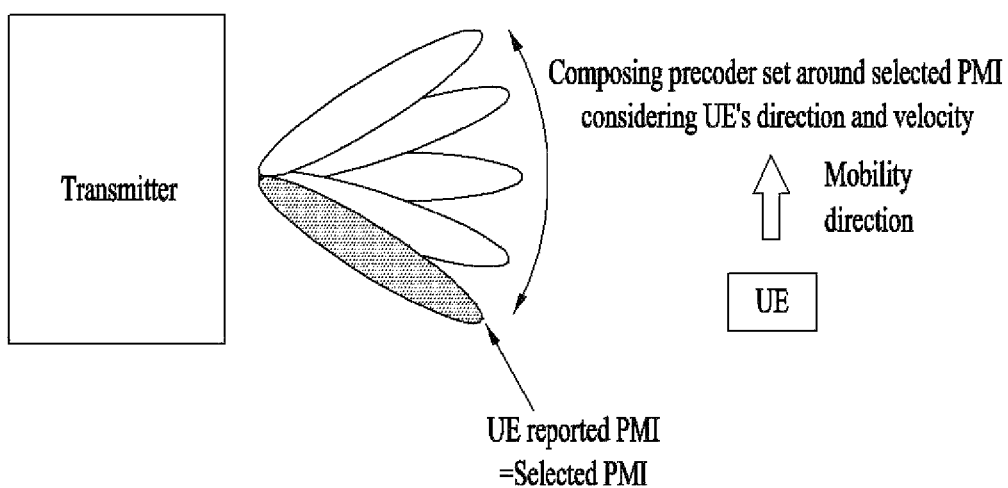
FIG. 20 is a diagram showing another example of a single-PMI based precoder determination method according to the present invention.

FIG. 20 is a diagram showing another example of a single-PMI based precoder determination method according to the present invention. In particular, assume that the method of 1) is applied to FIG. 20.

Referring to FIG. 20, it can be seen that the eNB may generate a precoder set in consideration of the movement direction and velocity of the UE based on the PMI selected and reported by the UE.

Figure 21:
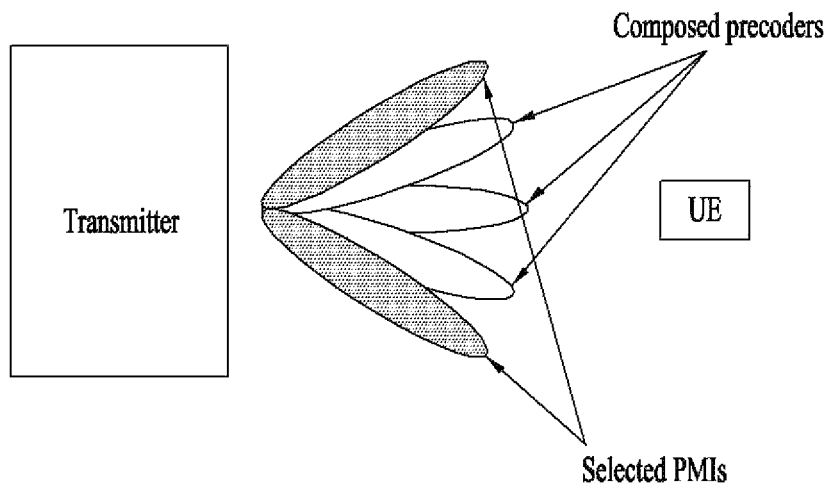
FIG. 21 is a diagram showing the concept of a multi-PMI based precoder determination scheme according to the present invention.

FIG. 21 is a diagram showing the concept of a multi-PMI based precoder determination scheme according to the present invention.

Referring to FIG. 21, a plurality of PMIs selected by a UE or an eNB (from a predefined codebook) is selected and is arbitrarily combined to generate a precoder set. Some or all of the plurality of selected PMIs may be PMIs selected by the UE or PMIs calculated through a channel measured by the eNB through uplink. In addition, some of the plurality of PMIs may be PMIs selected by the eNB according to mobility of the UE.

Figure 22:
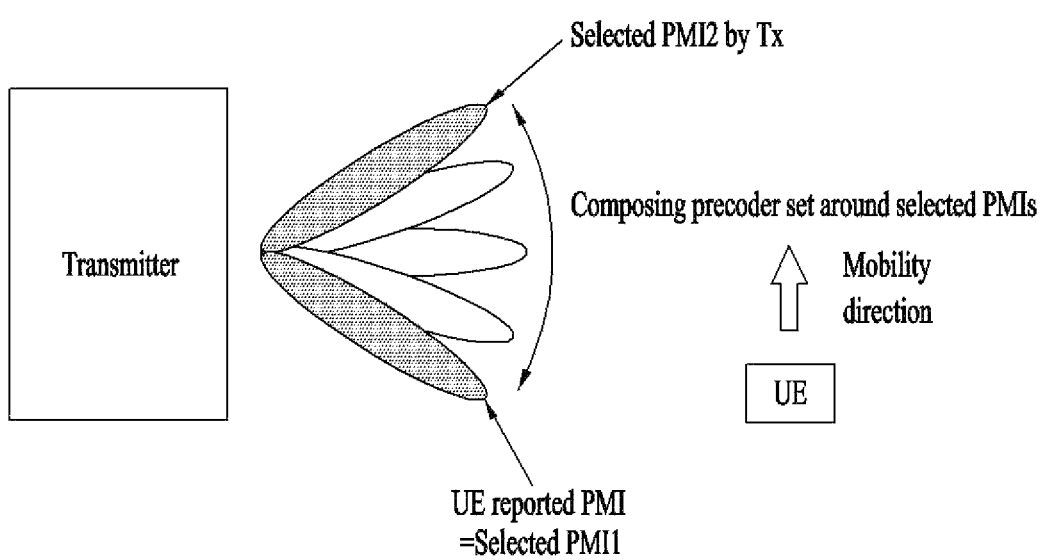
FIG. 22 is a diagram showing an example of a multi-PMI based precoder determination scheme according to the present invention.

FIG. 22 is a diagram showing an example of a multi-PMI based precoder determination scheme according to the present invention. In particular, in FIG. 22, a UE reports a single PMI.

Referring to FIG. 22, if a single PMI is reported, an eNB selects an additional PMI using mobility information, that is, movement direction and velocity, of the UE and then combines the two PMIs, thereby generating a precoder set.

Figure 23:
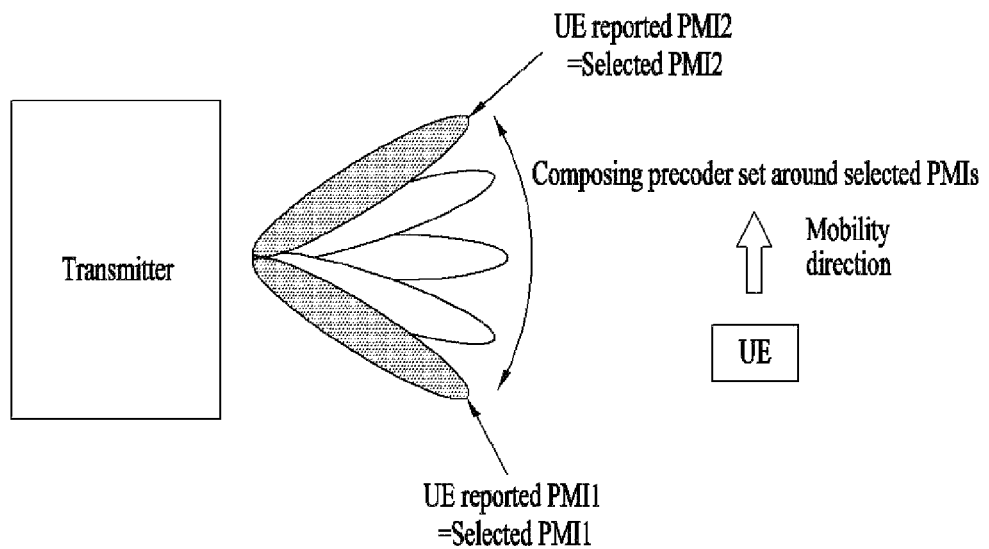
FIG. 23 is a diagram showing another example of a multi-PMI based precoder determination scheme according to the present invention.

FIG. 23 is a diagram showing another example of a multi-PMI based precoder determination scheme according to the present invention. In particular, in FIG. 23, a UE reports multiple PMIs.

Referring to FIG. 23, if the UE reports multiple PMIs, the UE may estimate change of a preferred PMI and/or channel quality change of the PMI and select and report a plurality of PMIs. The number of PMIs reported by the UE may be controlled by the eNB or may be determined by the UE.

Although the UE determines the plurality of PMIs based on only the channel quality at the channel measurement time, a PMI set having maximum quality at a data transmission time should be ideally reported. To this end, the PMI set should be selected by tracking the above-described PMI and quality change of the PMI.

Figure 24:
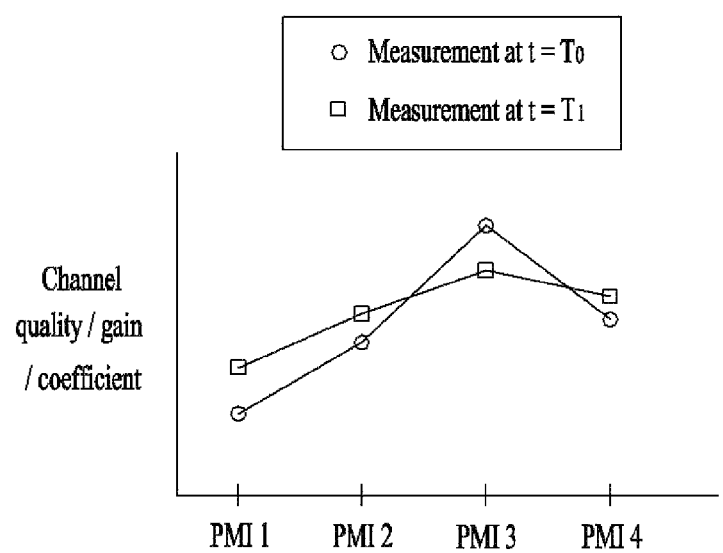
FIG. 24 is a diagram showing an example of channel quality variation tracking according to PMI.

FIG. 24 is a diagram showing an example of channel quality variation tracking according to PMI. In particular, FIG. 24 shows channel quality variation of the PMI at T0 and T1. Referring to FIG. 24, although PMI2 and PMI3 should be selected based on channel quality, it can be seen that PMI3 and PMI4 are selected and reported by predicting the channel at a time T2 when data will be transmitted.

Meanwhile, the selected PMI set is not necessarily included in the determined precoder set. For example, the PMI may include a low-granularity PMI set, for the purpose of maintaining low overhead of a PMI codebook.

Figure 25:
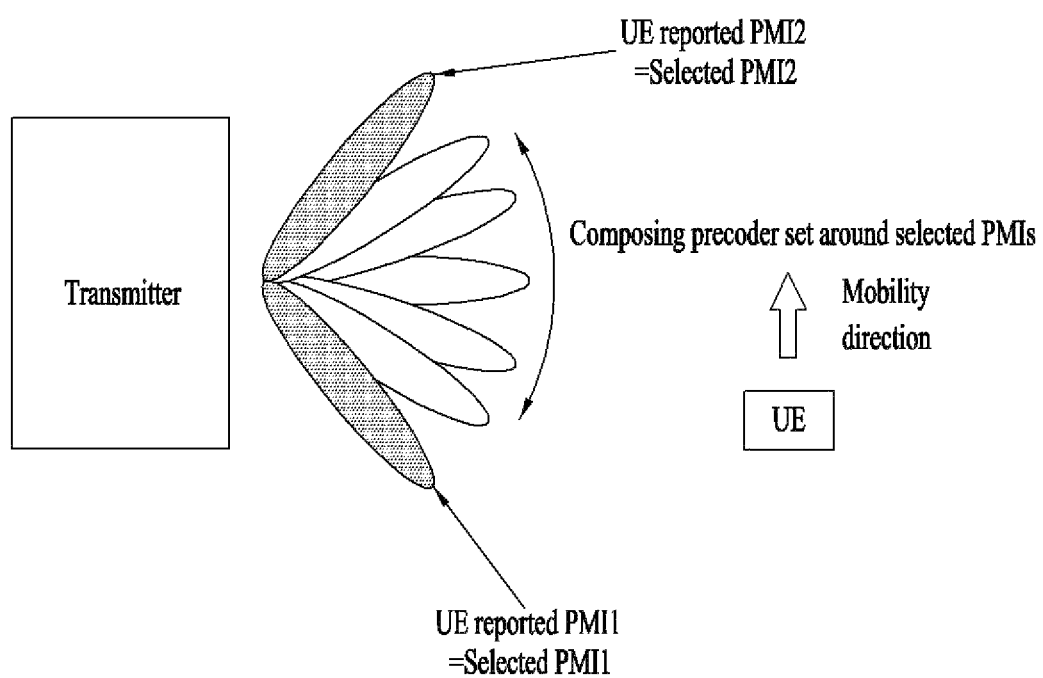
FIG. 25 is a diagram showing another example of a multi-PMI based precoder determination scheme according to the present invention.

FIG. 25 is a diagram showing another example of a multi-PMI based precoder determination scheme according to the present invention. Referring to FIG. 25, a UE reports PMI1 and PMI2 and an eNB selects PMI1 and PMI2 and composes a precoder set based on PMI1 and PMI2. However, it can be seen that the selected precoders PMI1 and PMI2 are excluded in the precoder set.

In order to apply channel adaptive precoder cycling of the present invention, the UE may deliver some or all of the following information to the eNB:

(A) one or more preferred PMIs,
(B) the preferred number of reported PMIs,
(C) the preferred size N of the precoder set, and
(D) the preferred values of parameters for generating the precoder set (e.g., maximum angle offset, directivity of angle offsets, composition coefficient, etc.)

In addition, the eNB may provide some or all of the following information in order to inform the UE of information on a precoding scheme or in order to acquire information for applying a channel adaptive precoder cycling scheme:

(a) the number $M_1$ of PMIs to be reported,
(b) the size N of the precoder set,
(c) the size M of the PMI codebook,
(d) $M-M_1$ PMIs selected by the eNB,
(e) the preferred values of parameters for generating the precoder set (e.g., maximum angle offset, directivity of angle offsets, composition coefficient, etc.), and
(f) PMI sorting information In the case of an existing PMI codebook, since the PMIs are sorted in order of beam transmission angles, it may difficult to generalize and apply a precoder set generation function. Accordingly, the PMIs need to be re-sorted to be suitable for the precoder set generation function. In this case, PMI sorting information may be provided to the UE. The PMI sorting information may be delivered as dedicated control information or broadcast information such as system information. Alternatively, a system may predefine PMI sorting information in a transmission mode, to which channel adaptive precoder cycling is applied, thereby applying the PMI sorting information without signaling.

This technology is applicable to a MIMO precoder which will be applied in a vertical direction and/or a horizontal direction in a 3D MIMO environment. In this case, this technology is applicable to a BA beamforming scheme, in addition to a beam width adaptation beamforming scheme through antenna ON/OFF, and is applicable to a DBA beamforming scheme if this technology is applied in only one of a vertical direction or a horizontal direction.

Although this technology is used to control the beam width according to the velocity and direction of the UE, this technology is used to adaptively control the beam width according to other channel parameters which are not determined according to the velocity and direction of the UE. For example, since beamforming gain may be changed according to angular spread of a radio channel and the number and distribution of ray clusters, this technology may be used to control the beam width based on these parameters. More specifically, if the angular spread of the channel is large or the number of ray clusters is large and the ray clusters are distributed, it may be determined that beamforming gain is relatively low and the channel will be highly likely to vary in the future. In this case, this technology is applicable in order to increase the beam width. In addition to the above example, control of the beam width may be determined and applied according to various determination criteria and the technology of the present invention may be used as means for controlling the beam width regardless of the determination criterion or purpose.

Although, as the PMI feedback information, one value is measured and reported with respect to the entire frequency bandwidth for convenience, the present invention is not limited thereto. In a broadband system, the entire frequency bandwidth may be divided into a specific frequency region (e.g., a subband, a subcarrier, a resource block, a carrier, a cell, etc.) and feedback information may be individually fed back with respect to each frequency region. Alternatively, feedback information may be transmitted with respect to only a specific frequency region selected by a UE or specified by an eNB. The frequency region may include one or more contiguous frequency regions or noncontiguous frequency regions.

Although the present invention is described based on downlink, the present invention is not limited thereto. This proposal is applicable to uplink in a state of changing the roles of an eNB and a UE. In addition, this proposal is applicable to UE-to-UE communication in a state in which a UE 1 functions as an eNB and a UE 2 functions as a UE.

Figure 26:
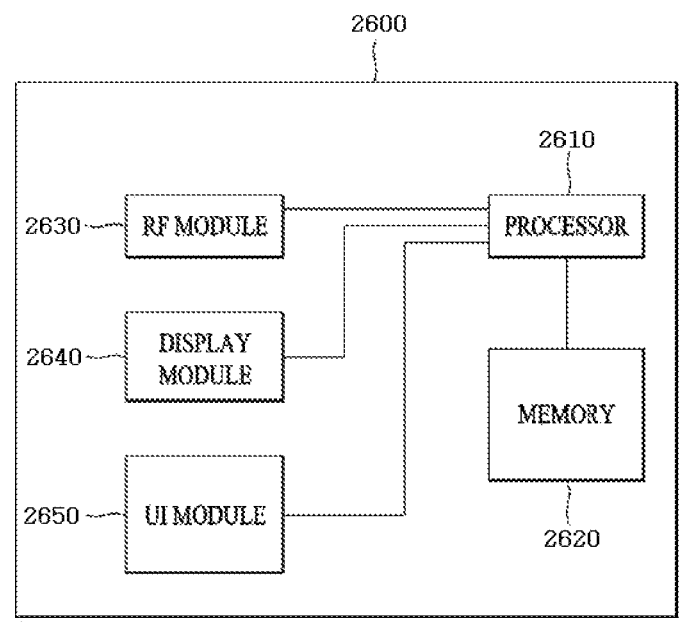
FIG. 26 is a block diagram of a communication apparatus according to one embodiment of the present invention.

FIG. 26 is a block diagram of a communication apparatus according to one embodiment of the present invention.

Referring to FIG. 26, a communication apparatus 2600 includes a processor 2610, a memory 2620, a Radio Frequency (RF) module 2630, a display module 2640 and a user interface module 2650.

The communication apparatus 2600 is shown for convenience of description and some modules thereof may be omitted. In addition, the communication apparatus 2600 may further include necessary modules. In addition, some modules of the communication apparatus 2600 may be subdivided. The processor 2610 is configured to perform an operation of the embodiment of the present invention described with reference to the drawings. For a detailed description of the operation of the processor 2610, reference may be made to the description associated with FIGS. 1 to 25.

The memory 2620 is connected to the processor 2610 so as to store an operating system, an application, program code, data and the like. The RF module 2630 is connected to the processor 2610 so as to perform a function for converting a baseband signal into a radio signal or converting a radio signal into a baseband signal. The RF module 2630 performs analog conversion, amplification, filtering and frequency up-conversion or inverse processes thereof. The display module 2640 is connected to the processor 2610 so as to display a variety of information. As the display module 2640, although not limited thereto, a well-known device such as a Liquid Crystal Display (LCD), a Light Emitting Diode (LED), or an Organic Light Emitting Diode (OLED) may be used. The user interface module 2650 is connected to the processor 2610 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method of transmitting a signal using a UE mobility-based precoder cycling technique in a wireless communication system and an apparatus therefor is applied to a 3GPP LTE system has been described, the present invention is applicable to various wireless communication systems in addition to the 3GPP LTE system.

The invention claimed is:

1. A method of transmitting a signal from a transmission end to a reception end in a wireless communication system, the method comprising:
   receiving information on at least one preferred precoder from the reception end;
   setting a reference precoder set within a predetermined beamforming angle range based on the at least one preferred precoder;
   composing a precoder set including one or more precoders from the reference precoder set based on a mobility of the reception end;
   cycling and applying the one or more precoders in specific resource units to precode the signal; and
   transmitting the precoded signal to the reception end,
   wherein at least one of a size of the precoder set and the one or more precoders is determined based on the mobility of the reception end.

2. The method according to claim 1, wherein a beam width of the precoded signal when the receiving end has high mobility is larger than the beam width of the precoded signal when the receiving end has low mobility.

3. The method according to claim 1, wherein the composing the precoder set includes selecting one or more precoders based on the at least one preferred precoder.

4. The method according to claim 1, wherein the composing the precoder set includes:
   selecting at least one specific precoder based on the mobility of the reception end; and
   selecting one or more precoders based on the at least one specific precoder.

5. The method according to claim 1, further comprising:
   transmitting information on the precoder set to the reception end,
   wherein the information on the precoder set includes sorting information of the one or more precoders included in the precoder set.

6. The method according to claim 1, wherein each of the specific resource units is one of a frequency resource unit or a time resource unit.

7. A transmission apparatus in a wireless communication system to transmit a signal from a transmission end to a reception end, the transmission apparatus comprising:
   a radio frequency (RF) transceiver; and
   a processor,
   wherein the processor is configured to:
      control the RF transceiver to receive information on at least one preferred precoder from the reception end,
      set a reference precoder set within a predetermined beamforming angle range based on the at least one preferred precoder,
      compose a precoder set including one or more precoders from the reference precoder set based on a mobility of the reception end,
      cycle and apply the one or more precoders in specific resource units to precode the signal, and
      control the RF transceiver to transmit the precoded signal to the reception end,
   wherein at least one of a size of the precoder set and the one or more precoders is determined based on the mobility of the reception end.

8. The transmission apparatus according to claim 7, wherein a beam width of the precoded signal when the receiving end has high mobility is larger than the beam width of the precoded signal when the receiving end has low mobility.

9. The transmission apparatus according to claim 7, wherein the processor selects one or more precoders based on at least one preferred precoder received from the reception apparatus.

10. The transmission apparatus according to claim 7, wherein the processor selects one or more precoders based on at least one specific precoder selected based on the mobility of the reception apparatus.

11. The transmission apparatus according to claim 7, wherein information on the precoder set is provided to the reception apparatus, and
   wherein the information on the precoder set includes sorting information of the one or more precoders included in the precoder set.

12. The transmission apparatus according to claim 7, wherein each of the specific resource units is one of a frequency resource unit or a time resource unit.

* * * * *